United States Patent
Ringhiser et al.

(10) Patent No.: US 9,514,099 B1
(45) Date of Patent: *Dec. 6, 2016

(54) DOCUMENTATION SYSTEM

(71) Applicant: Amazon Technologies, Inc., Reno, NV (US)

(72) Inventors: Raymond Robert Ringhiser, Maple Valley, WA (US); Dylan J. Proulx, Seattle, WA (US); Bharath Mukkati Prakash, Redmond, WA (US); Scot A. Marvin, Corvallis, OR (US); Benjamin C. Bernard, Shorline, WA (US); Paul Lynn Plummer, Seattle, WA (US); Gregory L. Bowen, Seattle, WA (US); Stephen J. Matlock, North Bend, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/293,118

(22) Filed: Jun. 2, 2014

Related U.S. Application Data

(63) Continuation of application No. 12/751,439, filed on Mar. 31, 2010, now Pat. No. 8,756,232.

(51) Int. Cl.
*G06F 17/30* (2006.01)
*G06F 7/00* (2006.01)
*G06F 17/21* (2006.01)

(52) U.S. Cl.
CPC .................................. *G06F 17/211* (2013.01)

(58) Field of Classification Search
None
See application file for complete search history.

(56) References Cited

U.S. PATENT DOCUMENTS

| | | | |
|---|---|---|---|
| 5,799,268 A * | 8/1998 | Boguraev | 704/9 |
| 6,212,494 B1 | 4/2001 | Boguraev | |
| 6,430,575 B1 | 8/2002 | Dourish et al. | |
| 6,820,094 B1 | 11/2004 | Ferguson et al. | |
| 7,139,977 B1 * | 11/2006 | Russell | 715/234 |
| 8,065,340 B2 * | 11/2011 | Petri | 707/803 |

(Continued)

OTHER PUBLICATIONS

Michael Priestley. "Dita XML: A Reuse byReference Architecture for Technical documentation". Oct. 21-24, 2001. ACM. pp. 152-156.*

(Continued)

*Primary Examiner* — Robert Beausoliel, Jr.
*Assistant Examiner* — Michael Pham
(74) *Attorney, Agent, or Firm* — Thomas | Horstemeyer, LLP

(57) ABSTRACT

Disclosed are various embodiments for a documentation system. Documentation topics for publishing in a node are received from a client. Embodiments of the disclosure determine whether the documentation topic has been assigned a topic identifier. Topic identifiers are assigned if the documentation topic has not been assigned a topic identifier and the documentation topic is assigned to at least one node in the documentation system. The documentation topics are stored in a data store and the topic identifiers are transmitted to the client. The topics are then published in at least one node of the documentation system.

19 Claims, 5 Drawing Sheets

(56) References Cited

U.S. PATENT DOCUMENTS

| | | | |
|---|---|---|---|
| 8,127,225 B2 | 2/2012 | Petri | |
| 8,397,161 B1* | 3/2013 | Shah et al. | 715/234 |
| 2004/0221228 A1 | 11/2004 | Day et al. | |
| 2005/0097452 A1 | 5/2005 | Eross | |
| 2006/0036612 A1 | 2/2006 | Harrop et al. | |
| 2006/0155578 A1 | 7/2006 | Eisenberger et al. | |
| 2007/0088711 A1 | 4/2007 | Craggs | |
| 2008/0288466 A1* | 11/2008 | Eisenberger et al. | 707/3 |
| 2009/0125804 A1 | 5/2009 | Brown et al. | |
| 2009/0183066 A1 | 7/2009 | Crawford et al. | |
| 2009/0193036 A1* | 7/2009 | Petri | 707/100 |
| 2009/0271711 A1 | 10/2009 | Hartshorn et al. | |

OTHER PUBLICATIONS

Nancy Harrison. "The Darwin Information Typing Architecture (DITA): Applications for Globalization". Jul. 10-13, 2005. IEEE. pp. 115-121.*

Anderson, et al. "Migrating HTML to DITA, Part1: Simple steps to move from HTML to DITA". Jan. 31, 2005. http://www.ibm.com/developerworks/xml/library/x-dita8a/. IBM developerWorks. Printed annotated pp. 1-10.

Day, et al. "Introduction to the Darwin Information Typing Architecture" Sep. 28, 2005. http://www.ibm.com/developerworks/library/x-dita1/. IBM developerWorks. Printed annotated pp. 1-12.

Hunt, et al. "Why use DITA to produce HTML deliverables?". Sep. 28, 2005 http://www.ibm.com/developerworks/library/x-dita6/. IBM developerWorks. Printed annotated pp. 1-6.

Donald M. Leslie. "Transforming Documentation from the XML Doctypes used for the Apache Website to Dita: a case study" 2001. Proceeding SIGDOC '01 Proceedings of the 19th annual international conference on Computer documentation. pp. 157-164.

* cited by examiner

DOCUMENTATION SYSTEM

CROSS-REFERENCE TO RELATED APPLICATIONS

This application claims the benefit of and is a continuation of U.S. application Ser. No. 12/751,439, entitled "DOCUMENTATION SYSTEM" and filed on Mar. 31, 2010, which is hereby incorporated by reference herein in its entirety.

BACKGROUND

The management of documentation topics in large scale documentation systems may require substantial labor due the volume of topics that need to be maintained. In particular, entry of topics in a documentation system can require significant data entry man-hours. Various users of the documentation system or consumers of documentation system content may also require documentation topics in various formats depending on their various needs.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

In a documentation system, as the number of documentation topics grows, so does the challenge of managing the documentation content. In particular, entry and updating of documentation topics in a data store associated with a documentation system can require significant data entry manual labor as users who author documentation topics may not have access to publish the documentation topics in the documentation system. Additionally, many documentation systems can require one-by-one entry of documentation topics into a data store of the documentation system.

Various users of a documentation system may also require documentation topics in various formats. As a non-limiting example, documentation topics can be published in hypertext markup language (HTML) and be made available via a content server or web server. Additionally, the same documentation topics may be required in a portable document format (PDF) or other standardized or proprietary formats. In the following discussion, a general description of the system and its components is provided, followed by a discussion of the operation of the same.

Figure 1:
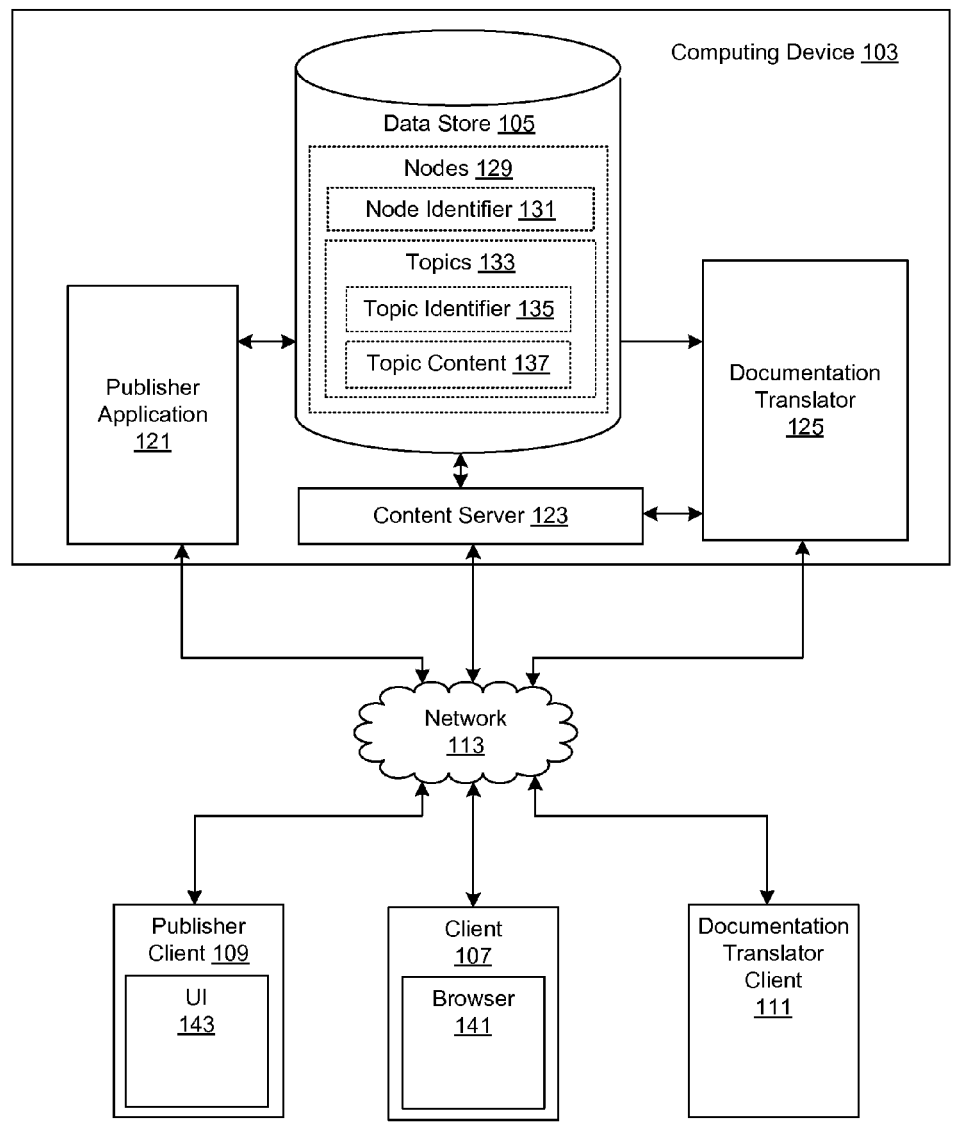
FIG. 1 is a drawing of networked environment according to various embodiments of the present disclosure.

With reference to FIG. 1, shown is a networked environment 100 according to various embodiments. The networked environment 100 includes at least one computing device 103, a data store 105, and one or more clients 107, 109, 111. The clients 107, 109, 111 are each in communication with the computing device 103 via a network 113. The network 113 includes, for example, the Internet, intranets, extranets, wide area networks (WANs), local area networks (LANs), wired networks, wireless networks, or other suitable networks, etc., or any combination of two or more such networks. The depicted networked environment 100 separately illustrates a client 107, a publisher client 109 and a documentation translator client 111 in communication with the computing device 103 via the network 113. The various clients 107, 109, 111 are shown separately for ease of illustrating the various functionality of embodiments of the disclosure, as it should be appreciated that the functionality that will be described in reference to the clients 107, 109, 111 can be implemented in a single client as well as in multiple clients in a configuration other than that shown herein.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise, for example, a cloud computing resource, a grid computing resource, and/or any other distributed computing arrangement. Such computing devices 103 may be located in a single installation or may be dispersed among many different geographical locations. In one embodiment, the computing device 103 represents a virtualized computer system executing on one or more physical computing systems. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data and/or items are stored in a data store 105 that is accessible to the computing device 103. The data store 105 may be representative of a plurality of data stores that can be geographically disparate and accessible to the computing device 103 via a network 113, as can be appreciated. As a non-limiting example, applications facilitating embodiments of this disclosure can be executed on the computing device 103, and other devices dedicated to providing the functionality of a data store 105 can be located in a separate installation accessible to the computing device 103. Additionally, the items and/or data stored in the data store 105, for example, are associated with the operation of the various applications and/or functional entities described below.

The components executed on the computing device 103, for example, include a publisher application 121, a content server 123, a documentation translator 125, and other applications, services, processes, systems, engines, or functionality not discussed in detail herein. The publisher application 121 is configured to publish documentation topics for serving to users of a documentation system implemented by the computing device 103. Documentation topics 133 can be authored by users and the publishing application 121 can store the topics in the data store 105, which is in communication with the computing device 103. The content server 123 facilitates the publishing of documentation topics to users. In some embodiments, users of a documentation system can access the computing device 103 via a browser or other client application, and the content server 123 can serve documentation topics to users via the network 113. The documentation translator 125 is configured to generate documentation topics in various formats that may be required or requested. Various users may require documentation topics in various formats, and the documentation translator 125 can provide the various formats from a single source in the data store 105.

The data stored in the data store 105 includes, for example, documentation nodes 129, which can be associated with one or more node identifiers 131. Each of the documentation nodes 129 can contain or be linked to various documentation topics 133. The topics 133 can be associated with a topic identifier 135 as well as topic content 137. The topic identifier 135 can uniquely identify the topic 133 in the data store 105. In the context of a documentation base maintained by a documentation system implemented by the computing device 103, the nodes 129 can represent a folder or directory in which topics 141 reside. In addition, nodes 129 can be associated with other nodes 129 that can be viewed as a sub-node of a parent node. In this way, a hierarchical structure can be formed that links various nodes 129 together with other nodes 129 and/or topics 133.

Additionally, topics 133 can be associated with more than one node 129, so that the topic content 137 can be published in more than one hierarchy of content. As a non-limiting example, a first documentation node 129 including a list of frequently asked questions can be associated with a certain topic 133 and include the topic content 137 associated with the topic 133, and a second documentation node 129 that includes topics 133 comprising a tutorial can also be associated with the topic 133 and include the topic content 137.

The depicted clients 107, 109, 111 are representative of a plurality of client devices that may be coupled to the network 113. The clients 107, 109, 111 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability. The client 107, for example, can access content published in a documentation system implemented by the computing device 103. In one embodiment, the client 107 can access documentation stored in the data store 105 via the content server 123. In one embodiment, the content server 123 can be a web server configured to serve content in the form of documentation from the data store 105 to the client 107 via hypertext transfer protocol (HTTP).

Accordingly, the client 107 may be configured to execute various applications such as a browser 141 and/or other applications. The browser 141 may be executed in a client 107 for example, to access and render network pages, such as web pages, or other network content served up by the content server 123 of the computing device 103 and/or other servers. The client 107 may be configured to execute applications beyond browser 141 such as, for example, email applications, instant message applications, and/or other applications.

The publisher client 109 can execute an application configured to interface with the publisher application 121. In some embodiments, the publisher client 109 can render in a browser 141 a publisher user interface 143 that is encoded by the publisher application 121 and transmitted to the publisher client 109. Other variations of facilitating interactions between a publisher client 109 and a publisher application 121 that are described herein should be appreciated. As one non-limiting example, the functionality of the publisher application 121 can be implemented entirely on a publisher application 121, which can then interact with a data store 105 on the computing device. Alternatively, the publisher application 121, publisher client 109, and data store 105 can all be implemented on different computing devices 103. Other variations should be appreciated by one of ordinary skill in the art.

In the depicted example, documentation can be managed and published by a user via the publisher client 109 and published in a documentation system implemented by the computing device 103 by the publisher application 121. A user can, via the publisher client 109, cause the publisher application 121 to create one or more nodes 129 in the data store 105. Upon creating a node 129, the publisher application 121 and/or data store 105 can assign a node identifier 131 to the created node 129. The node identifier 131 uniquely identifies a node 129 within the data store 105. As a non-limiting example, a user may desire to create a node 129 associated with help documentation regarding a particular application. Accordingly, the user can, via the publisher client 109, initiation creation of a node 129 associated with the help documentation. The user can then publish topics 133 associated with the created node 129, which can in turn be served up by the content server 123 to users who are accessing the documentation system on a client 107.

To facilitate the above functionality, a user can author documentation topics 133 on a publisher client 109. Content can be authored in a content authoring tool that facilitates the creation and editing of content consistent with various architectures for authoring, organizing, and/or delivering documentation. In one embodiment, content can be authored in a form that is compatible with a Darwin Information Typing Architecture (DITA). Accordingly, a DITA-aware editor can be employed to allow a content author to develop multiple documentation topics 133 associated with a particular node 129 as well as the development of a DITA map, which can be stored by the publisher application 121 in the data store 105. A DITA map allows a documentation hierarchy to be developed that specifies how various documentation topics 133 are related and the hierarchy in which they should be presented to a user on a client 107. Other documentation architectures can also be employed according to various embodiments of the disclosure. As a non-limiting example, content can be authored in a format compatible with the DocBook schema or other architectures that can be employed to facilitate organization of various topics in a node structure.

Accordingly, in order to add a documentation topic 133 to a particular node 129, a user can author content in a user interface 143 on a publisher client 109, and submit the content to the publisher application 121. The user interface 143 can allow the user to designate a node identifier 131 with which to associate the content. The user can then submit the content to the publisher application 121 via the publisher client 109, which can store the content as a topic 133 in the data store 105. The publisher application 121 and/or the data store 105 can assign the topic 133 a topic identifier 135, which can be communicated back to the publisher client 109.

Additionally, the publisher client 109 allows a user to submit multiple documentation topics 133 destined for various nodes 129 in the data store 105. Accordingly, the user interface 143 can allow a user to designate node identifiers 131 associated with various documentation topics 133 authored and/or edited on the publisher client 109. Accordingly, the various topics 133 can be submitted in batch fashion to the publisher application 121, which can identify each topic 133 and a node identifier 131 associated with each topic 133 and store each topic 133 in the data store 129 with the proper node 129. This batch submission functionality allows a documentation author to create and/or edit content associated with various topics 133 and nodes 129 and then publish the documentation topics 133 in batch fashion.

If the documentation topics 133 submitted by the publisher client 109 are new topics, then publisher application 121 can transmit topic identifiers 135 that it is has assigned to the submitted topics 133. The publisher client 109 can associate the topic identifiers 135 received from the publisher application with local copies of the documentation topics 133. In this way, a user can make future revisions to a particular documentation topic 133 and the publisher application 121 can synchronize the documentation topics 133 with those stored in the data store 105.

When storing documentation topics 133 in the data store 105, the publisher application 121 can convert the topic content 137 associated with topics 133 submitted by a publisher client 109 to a platform independent format and/or a storage format. In one embodiment, the publisher application 121 can convert the topic content 137 to an extensible hypertext markup language (XHTML), which can facilitate interoperability and/or conversion of topic content 137 associated with a documentation topic 133 to other formats. The topic identifier 135 and/or other meta data can be embedded in an XHTML document generated by the publisher application 121 and the document can be stored in the data store 105. Additionally, storage of topic content 137 associated with a documentation topic 133 facilitates serving of documentation topics 133 to a browser 141 on a client 107 via the content server 123. In other embodiments, the topic content 137 can be stored in an XML format, plain text, or other formats as can be appreciated.

Documentation topics 133 can also be extracted from the data store 105 and provided in various formats by the documentation translator 125 and provided to the documentation translator client 111. The documentation translator client 111 can, in one embodiment, request documentation topics 133 or entire nodes 129 along with their associated topics 133 from the documentation translator 125 in a desired format. The documentation translator client 111 can render a user interface in a browser encoded by the documentation translator 125, a web server, content server 123, or other similar application as can be appreciated. As a non-limiting example, the documentation translator client 111 can comprise a computing device executing a browser application that can access a user interface provided by the content server 123, which can request topics 133 from the documentation translator and provide them to the documentation translator client 111. Other variations should be appreciated, as the depicted illustration is but one example.

Because the publisher application 121 can store documentation content 137 of a documentation topic 133 in a platform independent format, such as XHTML, XML, etc., the documentation translator 125 can extract topic content 137 and generate other formats in which topic content 137 can be presented. As non-limiting examples, topic content 137 can be transformed into a PDF document, HTML, XML, Open Document Format (ODF) and other open and proprietary document formats and standards as can be appreciated. In other words, the documentation translator 125 can transform topic content 137 into a publication format.

The documentation translator 125 can retrieve multiple topics 133 associated with a node 129 or even multiple topics 133 associated with multiple nodes 129 in the data store 105 and generate documents in a requested format. As an example, a user of a documentation translator client 111 can request all topics 133 associated with a node 129 in a PDF document, and the documentation translator 125 can retrieve the topic content 137 associated with the topics 133 of the node 129 and generate a PDF document containing the topic content 137. The documentation translator 125 can also apply style sheets or apply additional formatting to the requested translated topic content 137 to alter the visual characteristics of the translated topic content 137. As one non-limiting example, the documentation translator 125 can apply a cascading style sheet (CSS) to the XHTML content retrieved from the data store 105 and then convert the topic content 137 to a PDF document.

The documentation translator 125 can also generate documentation outputs in one or more publication formats based upon predefined triggers. As one example, the documentation translator 125 can detect when the publisher application 121 modifies topics 133 in the data store 105 and push converted topics 133 to users of a documentation translator client 111 or other client 107. As a non-limiting example, a user of a documentation translator client 111 can specify that the documentation translator 125 automatically send the user an updated copy of a topic 133 that has been modified by the publisher application 121 in a specified format. As another non-limiting example, the user can specify that the documentation translator 125 send the user an updated copy of all topics 133 associated with a node 129 on a predefined schedule. Other variations of the above should be appreciated by a person of ordinary skill in the art.

Figure 2:
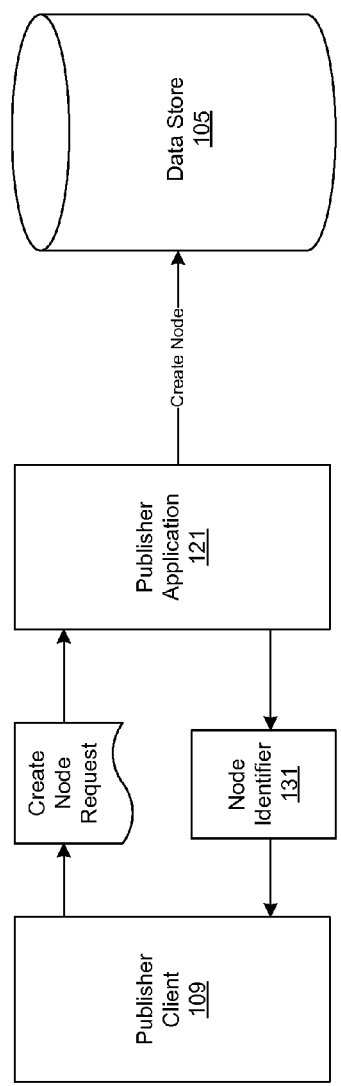
FIG. 2 is a drawing of a publisher application and a publisher client interacting in the networked environment of FIG. 1 according to various embodiments of the present disclosure.

Referring next to FIG. 2, shown is one example of the flow of data in an embodiment of the disclosure. In the depicted example, the publisher client 109 initiates a request to create a node 129 (FIG. 1) and transmits the request to the publisher application 121. Accordingly, the publisher application 121 creates a node 129 in the data store 105 and reports the node identifier 131 associated with the created node 129 to the publisher client 109.

Figure 3:
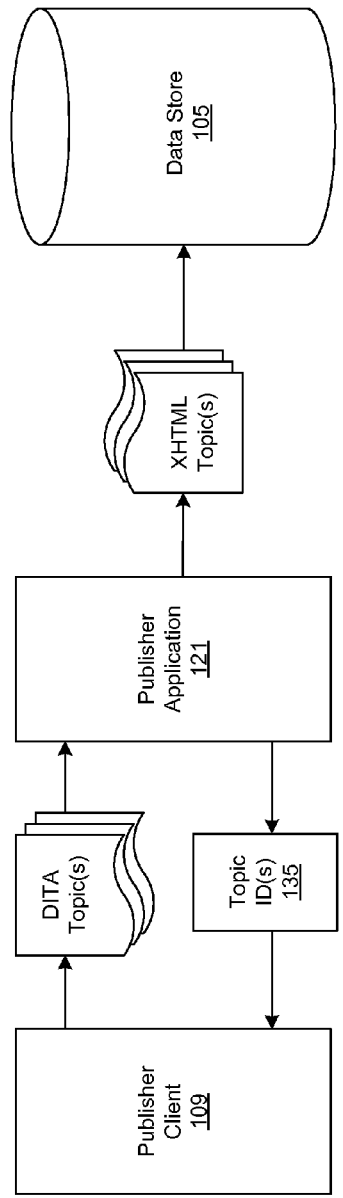
FIG. 3 is a drawing of a publisher application and a publisher client interacting in the networked environment of FIG. 1 according to various embodiments of the present disclosure.

Continuing the example of FIG. 2, reference is now made to FIG. 3, which illustrates the creation of topics 133 (FIG. 1) associated with the created node 129 (FIG. 1). In the depicted example, a user of the publisher client 109 (FIG. 1) can author topics 133 for publishing in a documentation system implemented by embodiments of the disclosure. The publisher client 109 can assign the node identifier 131 received from the publisher application 121 (FIG. 1) in FIG. 2 to the content authored by the user. In this way, a content author can add topics 133 to the node 129 the user created in the example of FIG. 2. It should be appreciated that the publisher client 109 can assign various node identifiers 131 (FIG. 1) to one or more documents authored and/or edited on the publisher client 109, thereby associating the content in various nodes 129 in the data store 105. In addition, the publisher client 109 can assign different node identifiers 131 to each document authored on the publisher client 109, thereby assigning each piece of content transmitted by the publisher client 109 to the publisher application 121 to different nodes 129 in the data store 105. Other variations of the above should be appreciated by a person of ordinary skill in the art.

In the depicted example, the publisher client 109 converts the content authored by the user consistent with a DITA architecture and transmits the content to the publisher application 121. The publisher application 121 can convert the DITA compatible content into XHTML documents and store the documents in the data store 105 as topics 133 with topic content 137 (FIG. 1). As noted above, the topics 133 are associated with a node 129 specified by a topic identifier 131 in the transmitted DITA compatible content. Accordingly, the publisher application 121 and/or data store 105 can assign topic identifiers 135 associated with each of the created topics 133 and transmit the topic identifiers 135 to the publisher client 109. It should be appreciated that the publisher application 121 can store the content transmitted by the publisher client 109 in any platform independent format, and that the depicted XHTML is but one example.

It should be appreciated that the publisher client 109 can assign a node identifier 131 and a topic identifier 135 of a preexisting topic 133, and the publisher application 121 will update the topic content 137 of the topic 133 associated with the node 129 in the data store 105. It should also be appreciated that while the example of FIG. 3 is illustrated with the publisher client 109 transmitting DITA compatible content to the publisher application 121 for storage in the data store 105, any content format known in the art can be employed consistent with the present disclosure.

Figure 4:
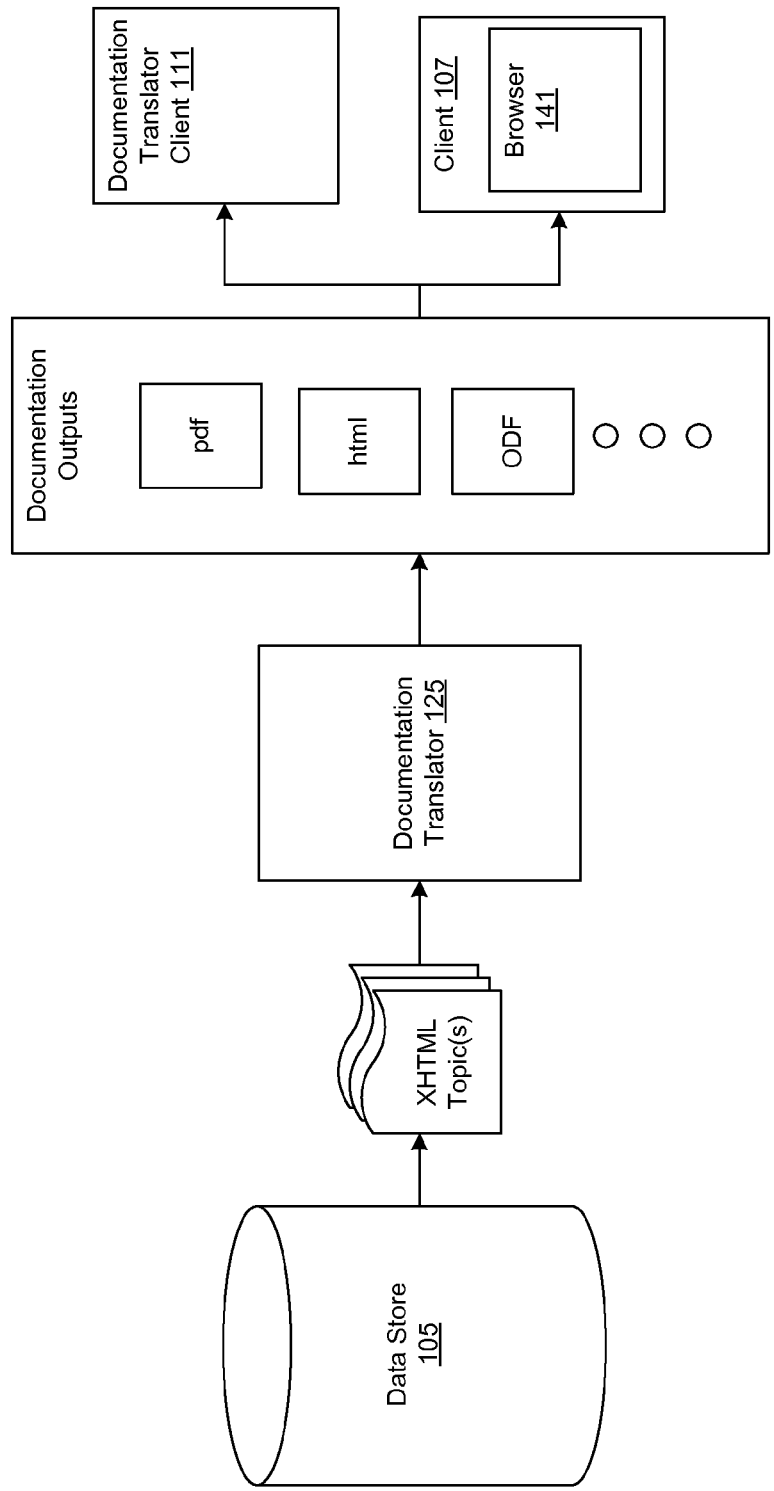
FIG. 4 is a drawing of a documentation translator and various clients interacting in the networked environment of FIG. 1 according to various embodiments of the present disclosure.

Reference is now made to FIG. 4, which continues the above example of FIG. 3. In the depicted example, the documentation translator 125, in response to a request from a client 107 and/or a documentation translator client 111, can retrieve topic content 137 associated with the requested topics 133 from the data store 105 can convert retrieved XHTML topics into various formats that are requested by a user of the documentation translator client 111. Accordingly, the documentation outputs generated by the documentation translator 125 can be transmitted to a documentation translator client 111 and/or other client 107 in the depicted example.

Figure 5:
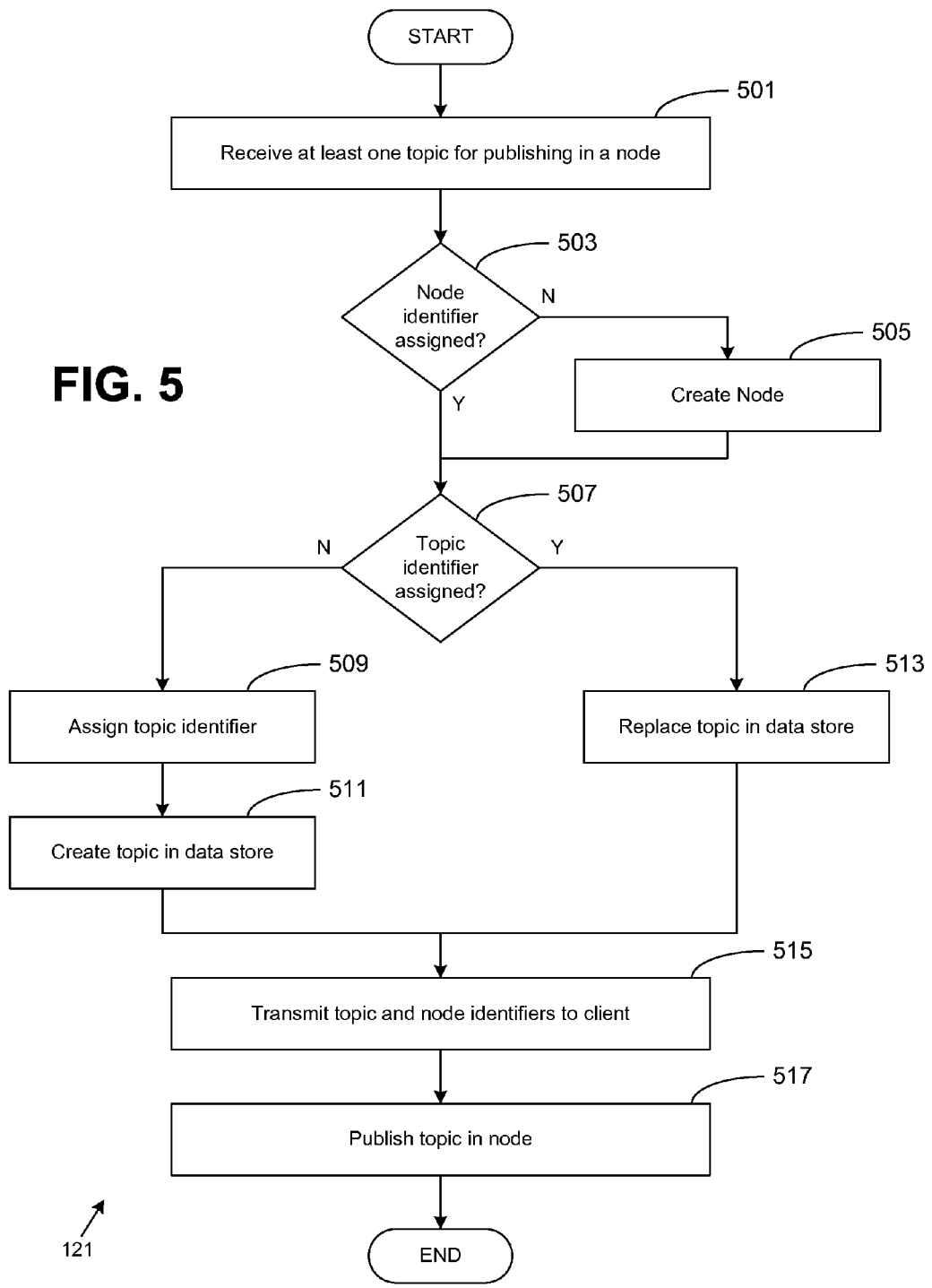
FIG. 5 is a flowchart illustrating one example of functionality implemented as portions of the publisher application as executed in a computing device in the networked environment of FIG. 1 according to various embodiments of the present disclosure.

Referring next to FIG. 5, shown is a flowchart that provides one example of the operation of a portion of the publisher application 121 according to various embodiments. It is understood that the flowchart of FIG. 1 provides merely an example of the many different types of functional arrangements that may be employed to implement the operation of the portion of the publisher application 121 as described herein. As an alternative, the flowchart of FIG. 5 may be viewed as depicting an example of steps of a method implemented in the computing device 103 (FIG. 1) according to one or more embodiments.

Beginning with box 501, the publisher application 121 receives at least one topic 133 (FIG. 1) for publishing in a node 129 (FIG. 1). In box 503, the publisher application 121 can determine whether a node identifier 131 (FIG. 1) is assigned and/or embedded in the at least one topic 133. If not, then the publisher application 121 creates a new node 129 in the data store 105 (FIG. 1) in box 505. In box 507, the publisher application 121 can determine whether a topic identifier 135 (FIG. 1) is assigned and/or embedded in the at least one topic 133. If not, then a topic identifier 135 is assigned by the publisher application 121 in box 509, and the topic 133 created in box 511. If a topic identifier 135 is assigned and/or embedded in the at least one topic 133, then in box 513, the corresponding topic 133 is replaced in the data store 105. Accordingly, in box 515, the topic identifier 135 and/or node identifier 131 is transmitted to a publisher client 109 (FIG. 1), and the topics 133 published in a node 129 of the data store 105 in box 517. In this sense, in one example, a topic 133 is "published" in the documentation system in the sense that it is made available users for viewing from the data store 105 by a user via a content server 123 (FIG. 1).

Figure 6:
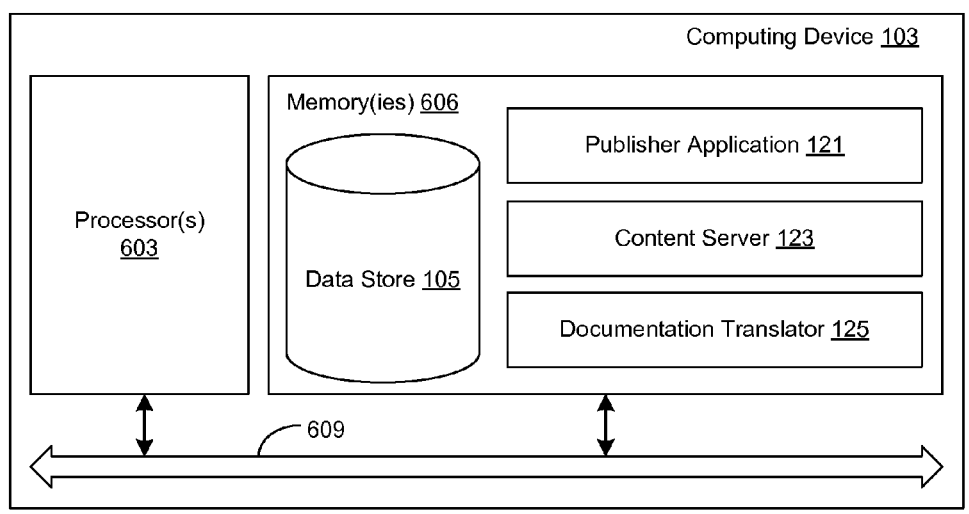
FIG. 6 is a schematic block diagram that provides one example illustration of a computing device employed in the networked environment of FIG. 1 according to various embodiments of the present disclosure.

With reference to FIG. 6, shown is a schematic block diagram of the computing device 103 according to an embodiment of the present disclosure. The computing device 103 includes at least one processor circuit, for example, having a processor 603 and a memory 606, both of which are coupled to a local interface 609. To this end, the computing device 103 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are publisher application 121, content server 123, and documentation translator 125, and potentially other applications. Also stored in the memory 606 may be a data store 105 and other data. In addition, an operating system may be stored in the memory 606 and executable by the processor 603.

It is understood that there may be other applications that are stored in the memory 606 and are executable by the processors 603 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate network 113 (FIG. 1) that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although publisher application 121, content server 123, and documentation translator 125, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 5 shows the functionality and operation of an implementation of portions of the publisher application 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowchart of FIG. 5 shows a specific order of execution, it is understood that the order of execution may differ from that which is depicted. For example, the order of execution of two or more blocks may be scrambled relative to the order shown. Also, two or more blocks shown in succession in FIG. 5 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including publisher application 121, content server 123, and documentation translator 125, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:

determining, via at least one of one or more computing devices implementing a documentation system in response to obtaining a document for publishing in a node in the documentation system, whether the document corresponds to a topic identifier, the topic identifier uniquely identifying a node within the documentation system, the node corresponding to a plurality of documentation topics;

assigning, via at least one of the one or more computing devices, the topic identifier to the document in response to determining that the document has not been assigned the topic identifier;

converting, via at least one of the one or more computing devices, topic content associated with the document into a storage format, the storage format being a platform independent format;

storing, via at least one of the one or more computing devices, the document in a data store in communication with the at least one computing device, the data store associated with the documentation system, the document being stored in the storage format;

triggering, via at least one of the one or more computing devices, conversion of a plurality of documents associated with the node from the storage format to a plurality of publication formats in response to storage of the document, the plurality of publication formats configured for presentation on a client;

identifying, via at least one of the one or more computing devices, a respective publication format associated with a respective client device; and transmitting, via at least one of the one or more computing devices, the respective publication format to the respective client device.

2. The method of claim 1, further comprising:

receiving, via at least one of the one or more computing devices, a request to create a new node in the documentation system from a requesting client;

creating, via at least one of the one or more computing devices, the new node in the data store associated with the documentation system; and transmitting, via at least one of the one or more computing devices, a node identifier associated with the new node to the requesting client, the node identifier uniquely identifying the new node within the documentation system.

3. The method of claim 1, wherein the storage format is at least one of: extensible hypertext markup language (XHTML), hypertext markup language (HTML) or plain text.

4. The method of claim 1, wherein converting the plurality of documentation topics associated with the node from the storage format to the plurality of publication formats further comprise translating individual ones of the plurality of documents into a plurality of foreign languages.

5. The method of claim 1, wherein converting the topic content associated with the document into the storage format further comprises converting the document to the storage format from a documentation format compatible with a documentation architecture, the documentation architecture comprising at least one of a Darwin Information Typing Architecture or a DocBook architecture and storing the document in the data store further comprises translating the document into a plurality of languages.

6. The method of claim 1, further comprising:

generating, via at least one of the one or more computing devices, a user interface facilitating selection of a plurality of documents for submission to the documentation system; and assigning, in the client, a node identifier corresponding to the node with which the plurality of documents are associated.

7. The method of claim 1, wherein converting the plurality of documents associated with the node from the storage format to the plurality of publication formats format further comprises:

identifying, via at least one of the one or more computing devices, individual ones of the plurality of documents that vary from a previous version of the individual ones of the plurality of documents; and converting, via at least one of the one or more computing devices, the individual ones of the plurality of documents that vary from the previous version to the plurality of publication formats.

8. A system, comprising:

at least one computing device in communication with a data store; and a publisher application executed in the at least one computing device, the publisher application causing the at least one computing device to at least:

in response to receiving a document comprising documentation content, identify a node in the data store to which the document corresponds based at least in part upon a node identifier associated with the document, the node identifier uniquely identifying the node within a documentation system;

convert topic content associated with the document into a storage format that is different from a format of the documentation content;

determine whether the document designates a topic identifier corresponding to a topic in the data store; and generate a topic identifier corresponding to the document in response to determining that the document fails to designate the topic identifier;

store the document in the data store in the storage format in association with the node;

trigger conversion of a plurality of documents associated with the node into a plurality of publication formats in response to storage of the document in the data store;

publish the plurality of documents associated with the node in the plurality of publication formats;

identify a respective publication format associated with a respective client device; and transmit the respective publication format to the respective client device.

9. The system of claim 8, wherein the storage format is a platform independent format.

10. The system of claim 9, wherein the storage format is based at least in part upon extensible hypertext markup language (XHTML).

11. The system of claim 8, wherein the document is encoded in a documentation format.

12. The system of claim 11, wherein the documentation format is compatible with a documentation architecture, the documentation architecture comprising at least one of a Darwin Information Typing Architecture or a DocBook architecture.

13. The system of claim 8, wherein the plurality of documents associated with the node are published in the plurality of publication formats by applying a style sheet to the plurality of documents that specifies a visual appearance of a plurality of converted documents.

14. A non-transitory computer-readable medium embodying a program executable in a computing device, the program causing the computing device to at least:

in response to receiving a document from a client for publishing in a node of a documentation system, determine whether the document has been assigned a topic identifier;

generate the topic identifier in response to the document not being assigned the topic identifier;

convert a topic content of the document to a storage format, the storage format being a platform independent format that is different from a format of the topic content;

store the document in the storage format in a data store in association with a node, wherein the node is associated with a plurality of documents;

trigger creation of a plurality of document outputs corresponding to individual ones of the plurality of documents into a plurality of publication formats in response to storage of the converted document;

identify a respective publication format associated with a respective client device; and transmit the respective publication format to the respective client device.

15. The non-transitory computer-readable medium of claim 14, wherein the plurality of publication formats comprises a plurality of formats configured for rendering by the client.

16. The non-transitory computer-readable medium of claim 14, further comprising code that transmits the plurality of document outputs to at least one other computing device in response to creation of the plurality of document outputs.

17. The non-transitory computer-readable medium of claim 14, wherein creation of the plurality of document outputs is triggered by translating individual ones of the plurality of documents into a plurality of foreign languages.

18. The non-transitory computer-readable medium of claim 14, wherein creation of the plurality of document outputs is triggered by determining whether a previous version of the document varies from a current version of the document.

19. The non-transitory computer-readable medium of claim 18, wherein creation of the plurality of document outputs is triggered only when the current version of the document varies from the previous version of the document.

* * * * *